United States Patent [19]
Cooper

[11] Patent Number: 5,572,261
[45] Date of Patent: Nov. 5, 1996

[54] AUTOMATIC AUDIO TO VIDEO TIMING MEASUREMENT DEVICE AND METHOD

[76] Inventor: J. Carl Cooper, 15288 Via Pinto, Monte Sereno, Calif. 95030

[21] Appl. No.: 486,542

[22] Filed: Jun. 7, 1995

[51] Int. Cl.$^6$ ................................................. H04N 9/475
[52] U.S. Cl. ........................ 348/512; 348/515; 348/518; 382/100; 382/209
[58] Field of Search ........................ 348/515, 512, 348/518, 571, 96, 97, 14; 382/100, 103, 107, 209, 159, 226; H04N 9/475

[56] References Cited

U.S. PATENT DOCUMENTS

| | | | |
|---|---|---|---|
| Re. 33,535 | 2/1991 | Cooper | 358/149 |
| 4,313,135 | 1/1982 | Cooper | 358/149 |
| 4,769,845 | 9/1988 | Nakamura | 382/100 |
| 4,841,575 | 6/1989 | Welsh et al. | 382/209 |
| 4,975,960 | 12/1990 | Petajan | 382/100 |
| 5,202,761 | 4/1993 | Cooper | 358/149 |
| 5,387,943 | 2/1995 | Silver | 348/512 |

Primary Examiner—Micheal H. Lee
Attorney, Agent, or Firm—J. Carl Cooper

[57] ABSTRACT

The apparatus and method described herein provides for detecting or measuring the relative timing of the audio and video portions of an audio visual program by inspection of the opening and closing of the mouth of a speaker, and comparing that opening and closing to the utterance of sounds associated therewith.

30 Claims, 7 Drawing Sheets

AUTOMATIC AUDIO TO VIDEO TIMING MEASUREMENT DEVICE AND METHOD

BACKGROUND OF THE INVENTION

The invention relates to the automated measurement of relative audio to video timing in audio visual communications systems. The invention is of particular use in film and television type systems, as well as any other system where the audio and vision portions of a program are carried separately and delays to one or the other, or both, cause missynchronization of an associated audio and vision signal. This missynchronization is commonly referred to as lip sync error. Other uses and purposes for the present invention will also become known to one skilled in the art from the teachings herein.

1. Field of the Invention

The field of the invention includes the use of film, video and other storage and distribution systems where audio and video are carried, at least in part of the system, in separate transmission, processing or storage paths. Delays in one path or the other or both can cause missynchronization of the visual and associated audio signal, causing a need to delay the earlier of the two or more signals to place the signals back into synchronization. The present invention is for automatically measuring the relative delay or timing difference between a visual and one or more associated audio signals by comparing particular types of movements and other cues in the visual signal to particular types of sounds and silences in the audio signal. The system is automatic and will operate where the delays may be automatically continuously changed or operator adjusted from time to time.

2. Description of the Prior Art

It is well known in television systems to provide for timing adjustment of audio to video signals by various means of measuring video delays, coupling the amount of video delay or advance to an appropriate audio or video delay and delaying the earlier arriving of the two to place them back in synchronism. Such systems are shown for example in U.S. Pat. No. 4,313,135 to Cooper, RE 33,535 (U.S. Pat. No. 4,703,355) to Cooper and U.S. Pat. No. 5,202,761 to Cooper and U.S. Pat. No. 5,387,943 to Silver.

The prior art systems by Cooper mentioned above all either need the availability of video signal before the delay to encode a timing signal or as a reference to measure video delay and are not intended to operate with audio and video signals which are received out of sync.

The Cooper '135 Patent shows measuring relative video delay by inspecting relatively delayed and undelayed video and delaying audio by a corresponding amount. The Cooper '535 patent shows measuring the relative audio to video delay by use of timing signals embedded in the video, and the use of delays or variable speed controls on the playback mechanisms to maintain or achieve proper synchronization. The Cooper '761 patent also shows a different approach to measuring the relative audio to video delay by use of timing signals embedded in the video, direct control of video and audio delays, as well as the use of delays or variable speed controls on the memory playback mechanisms to maintain or achieve proper synchronization. For the sake of brevity, the term AV sync will be used to mean all the various types of systems and signals in which there is audio and visual program information timing.

The prior art Silver system is intended to operate with audio and video signals which are received out of sync without access to the video signal before delay is added, but is not automatic. The Silver system only shows how to semiautomatically measure the relative timing but does not show an automatic system in that the operator must always locate the lips in the video frame. A disadvantage of Silver's invention is that it is easily fooled since his suggested method of correlating motion vectors with audio characteristics is not very precise.

One reason for the correlation being fooled is that there is a one to one correspondence between opening and closing of the mouth, and the opening and closing occurs at fairly regular intervals, and since there will be one closing for every opening. Silver did not realize these problems, since he states that "the processor matches peaks in the audio data with open mouths in the video data and valleys in the audio data with closed mouths in the video data" (Col. 3 1 25–32). In addition, Silver requires an operator to locate the mouth.

Silver does not show how to automatically keep the AV timing in sync. The Silver '943 patent shows a "semiautomatic" system for detecting relative audio to video timing errors (Col. 1, lines 52–55) which uses "Motion vectors [which] are computed by the motion detector from the extracted video data on a frame-by-frame, or field-by-field, basis to determine the direction and relative amount of motion between the lips. Also the size of the mouth opening is determined. Any one or more of common motion detection/estimation algorithms may be used, such as sub-pixel block matching, to generate the motion vectors" (Col. 2, lines 41–49). The video data which is used for these computations comes from "The portion of the video signal from the frame buffer corresponding to the lips as outlined by the operator is input to a motion detector to product motion vectors".

About his operation, Silver says "The processor 16 correlates zero motion vectors with open and closed mouths. Then, using a time correlation technique of sliding the data records in time relative to each other, the processor matches peaks in the audio data with open mouths in the video data and valleys in the audio data with closed mouths in the video data".

OBJECTS AND DISCLOSURE OF THE INVENTION

The invention described herein provides for a method and apparatus whereby the location and movement of the mouth or lips may be automatically determined. For the purposes of the present invention, the word mouth is meant to encompass the hole between the lips or absence thereof, the palate, lips, teeth, tongue and various combinations thereof as will change as the mouth moves and will be apparent from the context of the description of the invention or claims therefore given below.

The invention provides for identifying the presence and location of mouth related pixels referred to herein as mouth pixels and information or data of pixels which may include mouth pixels as pixel type, i.e. pixel type data may identify a particular pixel as being a particular type of mouth pixel, or signify that the pixel is not a mouth pixel.

The invention provides for identifying the presence and occurrence in time, in both the visual and audio program portions, of mouth generated sounds referred to herein as mouth sounds.

The invention further provides for comparing visual mouth sounds to audio mouth sounds to determine the relative timing therebetween.

The invention provides for identifying the presence of movements and nonmovements of the lips referred to herein as mouth motion. Some examples of mouth motion are opening, closing, open and closed.

The invention also provides for responding to one or more of the parameters of the direction of movement of the lips and in particular including the determination of whether they are getting closer or further apart, thereby giving knowledge of mouth opening or closing which are part of the mouth motion.

The invention further provides for using knowledge of the mouth opening or closing to imply the possibility of the mouth being open or closed for a period of time following the motion.

The invention yet further provides for analyzing the patterns of mouth movement to determine the possible types of sounds being uttered thereby determining mouth sounds.

The invention still further provides for determining the relative timing of audio and video portions of a program by comparing the types of sounds being uttered by the mouth with types of sounds of an associated audio signal wherein the types of sounds compared correspond to particular types or patterns of lip movement and exposures of upper and bottom teeth.

The invention yet still further provides for comparing the patterns of movement of the lips to determine the opening or closing of the mouth and the utterance of particular sounds or types of sounds.

In particular, it is an object of the invention to detect and use the following mouth and sound parameters for the comparison of relative AV sync timing:

1) For most programs where lip sync is noticeable to a viewer, the lips are generally contained in the horizontal middle third of the screen and the vertical middle half;

2) Lip motion is virtually always vertical with flesh colored lips creating specific visual patterns by alternatively covering and exposing a black hole and the teeth. All natural flesh colors are strong in red and weak in green and blue primary colors;

3) The upper and lower teeth may be exposed individually or together, depending on the sound being spoken and the pattern of movement of the lips taken in conjunction with the patterns of exposure of teeth and the black hole may be used to identify specific sounds;

4) The lips virtually always move at the same time in opposite directions although for most sounds the upper lips generally move less than the lower lips;

5) Sound is usually loudest while the lips are moving or open, although frequent pauses with the mouth open and no sound coming out and lips closed with strong sound coming out are common;

6) The detection of patterns of lip movements may be made by simply inspecting the time dependent voltages corresponding to pixels or groups of pixels located in the area within, above and below the black hole formed by the mouth, with this black hole being distinguished by a dark area surrounded by colors having a red component which is stronger than the green and blue components;

7) The associated sound waveform may be analyzed to detect the presence of particular sounds or sound elements which correspond to known patterns of lip movements.

Another object of the present invention includes measuring the relative timing of audio and video signals which are received out of sync without access to the video signal before delay is added.

Yet another object of the invention is to automatically keep the AV sync correct by first delaying the earlier signal and then comparing the delayed signal with the later signal to determine if the delay applied to the earlier signal is adequate or proper, and if not to determine the direction of change which the delay needs to make in order to bring the delay to the proper amount.

Other objects and features of the invention will be apparent to one of ordinary skill in the art from the teachings herein.

DESCRIPTION OF THE PREFERRED EMBODIMENT

Figure 1:
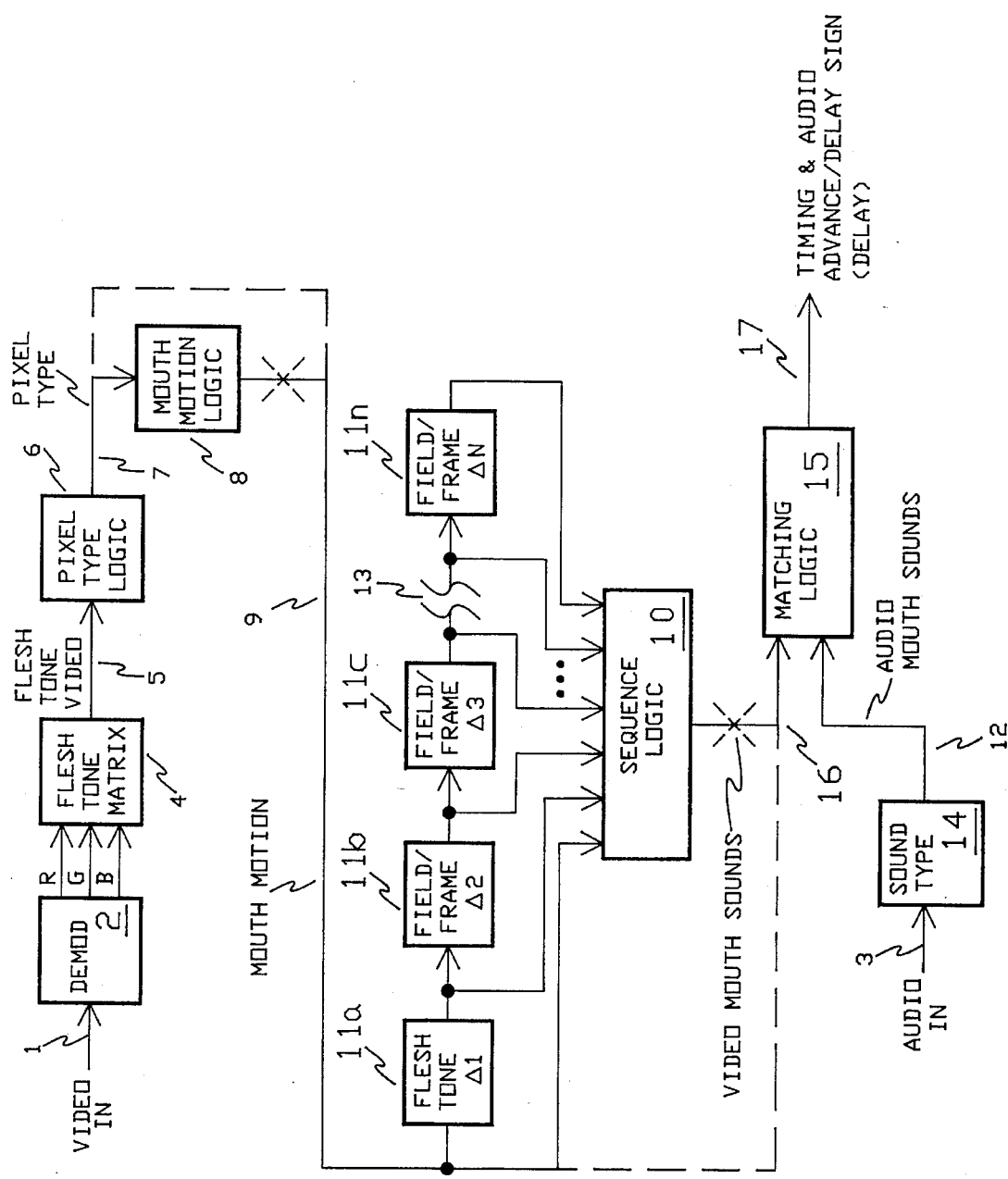
FIG. 1 is a block diagram of the preferred embodiment of the timing and delay detection portion of the invention.

FIG. 1 is a block diagram of the preferred embodiment of the timing and delay detection portion of the invention which is described herein by way of example for use with television composite video signals. It will be understood however that the present invention described by way of the example of the preferred embodiment may also be utilized with other types of audio and visual systems including other types of electronic systems such as those utilized in the computer, film and printing industries.

FIG. 1 shows composite video input 1, demodulator 2 responsive to input video to provide Red, Green and Blue signal components thereof for use by the flesh tone matrix 4 which provides a flesh tone video signal 5 which is optimized to have maximum output when flesh colored video is input thereto. It is preferred that video at 1 be in sampled and digitized form in order that the invention may be implemented with digital circuitry. Flesh tone matrix 4 is also preferred to only output a signal during the horizontal middle third and the vertical middle half of the image frame. The flesh tone video signal 5 is input to a pixel type logic circuit 6 which identifies the pixel type of the flesh tone video pixels which are input thereto, and outputs a pixel type code 7 which is applied to a mouth motion logic circuit 8.

The inputs to the mouth motion logic circuit 8 thus correspond to the type of facial element which the particular pixel or point on the image is taken from or represents in a particular image frame, with a degree of certainty based on information of the same and/or similarly locate pixels over past and future frames of the video. In particular, it may be determined that a particular pixel represents a black hole in the mouth, flesh, upper lips, lower lips, upper tooth, lower tooth or none of these facial elements. Other facial elements may be detected and represented as well as will be apparent to one of ordinary skill in the art from the teachings herein.

The mouth motion logic circuit 8 analyzes the time patterns of the pixel type data from 6 and outputs mouth motion data 9 to field or frame delays 11 and sequence logic 10. Field or frame delays 11*a*, 11*b*, 11*c*, thorough 11*n* delay the mouth motion data 7 by N fields or frames as appropriate, thereby providing N+1 frames of data corresponding to a particular point on the image at any given time.

It is preferred to utilize frame delays for 11, however field delays may also be utilized at a cost savings, with only a small decrease in performance. In the preferred invention the mouth motion data will identify opening, closing, types of open, closed and none for each of the pixel types which are input thereto. The none identification will be output if the corresponding input pixel type sequences are not mouth related, or can not be identified as pertaining to a particular type of mouth motion. It may be noted that the none type of mouth motion data will make up the majority of 9, and further that this data is not used by 10. The none data need not be delayed by the delays 11 thus a cost savings may be had by implementing the delays 11 with random access memories wherein only the wanted data is stored, along with its location in the image frame. The random access memories will then operate to simultaneously output data from the same image area, which data will be utilized by 10. This operation will have the particular advantage of compensating for position changes of the mouth from frame to frame. The use of motion vectors which is well known in the art, may be included to facilitate tracking movement from frame to frame with either delay or random access types of memories.

It is preferred that the number of delays 11 (N) be 12 for NTSC video and 10 for PAL video. This provides 0.4 seconds of stored video information in 13 (NTSC) or 11 (PAL) image frames which is sufficient for locating and identifying most mouth sounds. It will be appreciated however that smaller numbers may be used for reasons of economy and larger numbers may be used for improved accuracy. This variability in the desired value of N is expressed in FIG. 1 by 13, a symbol indicating that a number of delays are omitted from the drawing.

The sequence logic 10 is responsive to the N outputs from 11*a–n* as well as 9 to determine whether the pixel representing the time median of those inputs represents a mouth open sounds, closed sounds, opening sounds, closing sounds and if open the particular type of open sound. It may be noted that it is preferred that the output 16 represent the median frame of the group of frames from 8 and 11, in order that frames both before and after the median pixel are available. This relationship may however be changed to more accurately determine mouth sounds which have peculiar motions before or after the sound. It may also be noted that if there are an even number of image frames input to 10 that the median will be a combination of the middle two, corresponding in time to the midpoint of the frames.

The pattern of mouth position and movements, which may also be referred to as mouth sounds, is then coupled to a matching circuit 15 via 16. It will be noted that the mouth motion 9 is similar to the pixel type 7, but by operation of the mouth motion logic 8 is more reliable information and more detailed. In particular 8 may determine from the presence or absence of teeth during the opening and closing of the mouth, and during the period of time the mouth is open, the types of open, opening and closing which are present, and thus provide a more accurate knowledge of the types of sounds being uttered.

It would be possible to couple the output of 6 directly to 10 and 11, or to couple the output of 6 or 8 directly to 15, at a reduced degree of performance since all of the data 7, 9 and 16 contain patterns and changes which may be compared against 12, and data 7 or 9 may be used directly to provide 16, as indicated by the dotted connections in FIG. 1.

FIG. 1 additionally shows an audio input for an audio channel corresponding to the video at 3 which audio is coupled to a sound type detection circuit 14 which detects whether the sound over the previous field or frame represents a sound which is made with one of the mouth open, closed, opening or closing mouth Motions, which will be referred to as mouth sounds. The choice of using a field or frame for determining sound should match the length of the delays 11 in order that the time period for mouth motion and mouth Sound coupled to the matching circuit 15 are the same.

Matching circuit 15 operates to match the sequence of mouth Motions from 16 with the sequence of mouth sounds from 12 as is well known in the art for matching (for example by correlating) two digital patterns. Simply described this matching may be performed by storing a sequence of mouth Motions in a register, storing a larger number (for example twice as many) of mouth sounds in another register and then sliding the sound pattern past the motion pattern until the best match is found. The relative position of the patterns when the match is found is a measure of the relative timing therebetween. The matching circuit 15 takes into account static delays, such as delays incurred in elements 2, 4, 6, 8, 10, 11, 14 and 15 and outputs a timing signal which carries with it the amount of delay and a sign indicating whether it is the audio or the video which is delayed with respect to the other. The sign of the delay will be useful in correction circuits to indicate which signal is the earlier arriving of the two and is to be delayed in order to cause it to match the other.

Figure 2:
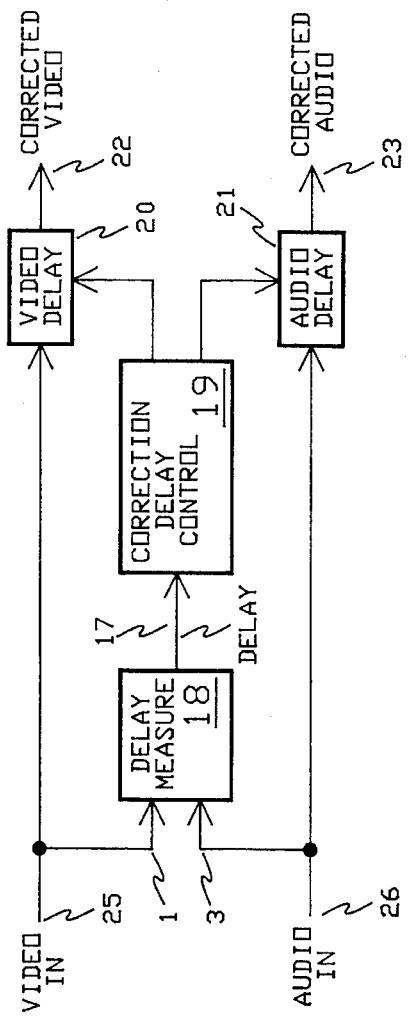
FIG. 2 is a block diagram of the preferred embodiment of the measure before correction embodiment of the invention.

FIG. 2 shows an embodiment of the invention in which the arriving video signal 25 and arriving audio signal 26 are coupled to delay measurement circuit 18 which corresponds to FIG. 1, a video delay 20 for delaying the video signal when it is the earlier arriving signal, an audio delay 21 for delaying the audio when it is the earlier arriving signal, a correction delay control circuit 19 responsive to both the timing and sign of the delay signal 17 to cause the appropriate one of 20 or 21 to provide the amount of delay indicated in order that the earlier arriving one of the audio and video signal is delayed to match the later arriving one. Correction Delay Control 19 further causes the delay for the later arriving signal to be minimized, thus providing synchronized signals 22 and 23.

Figure 3:
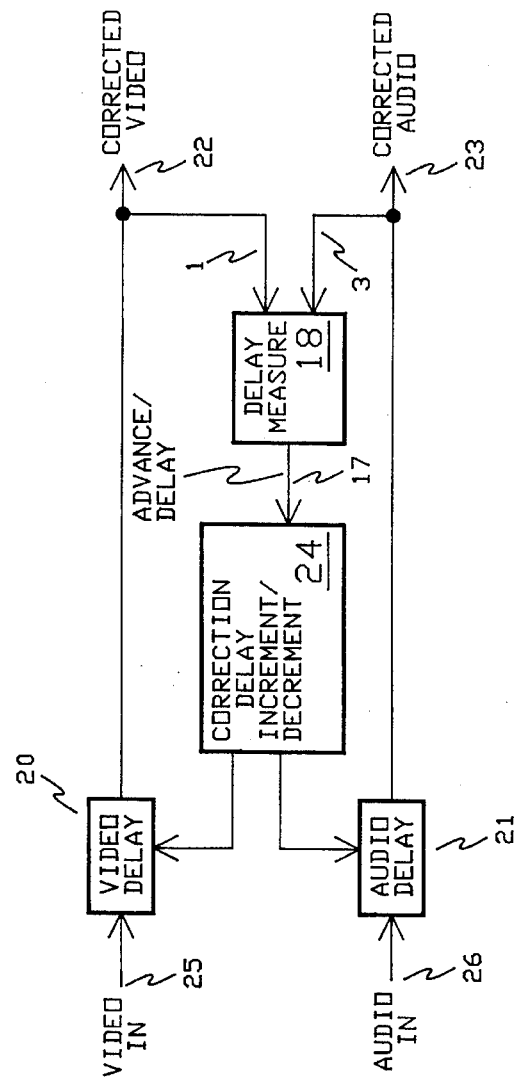
FIG. 3 is a block diagram of the preferred embodiment of the correction before measure embodiment of the invention.

FIG. 3 shows an embodiment of the invention in which the arriving video signal 25 and arriving audio signal 26 are coupled to a video delay 20 for delaying the video signal when it is the earlier arriving signal and an audio delay 21 for delaying the audio when it is the earlier arriving signal. A delay measurement circuit 18 which corresponds to FIG. 1 is shown coupled to corrected video 22 and corrected audio 23 to determine the relative delay therebetween.

A correction increment/decrement circuit 24 is responsive at least to the sign of the delay signal 17 to cause the appropriate one of 20 or 21 to provide an amount of delay needed in order that the earlier arriving one of the audio and video signal is delayed to match the later arriving one, and further to cause the delay for the later arriving signal to be minimized, thus providing synchronized signals 22 and 23. The correction delay increment/decrement circuit may operate to receive the amount of delay from 17 and add or subtract that amount from the delaying one of 20 or 21 in order to adjust the total delay to the proper value.

The correction delay increment/decrement circuit may also simply operate to increase or decrease the delay of one of 20 or 21 in response to the sign of the delay signal 17 until proper delay is achieved. For example, if video delay 20 is delaying video, and the video 22 is advanced, 24 may operate in response to the indication of advance from 18 to increase the video delay 20. Similarly if the video 22 is delayed, 24 may operate in response to the indication of advance from 18 to decrease the video delay 20. In the event the video delay 20 is already at its minimum value then 24 will operate to increase the audio delay 21. Similarly, changeover from audio delay to video delay may also be made by 24 in response to 18. It will be recognized that for the operation of FIG. 3 that only an indication of which signal 22 or 23 is advanced is required. Consequently, it is not necessary for 18 to determine the amount of the delay, and the circuitry relative to this determination may be eliminated.

Figure 4A:
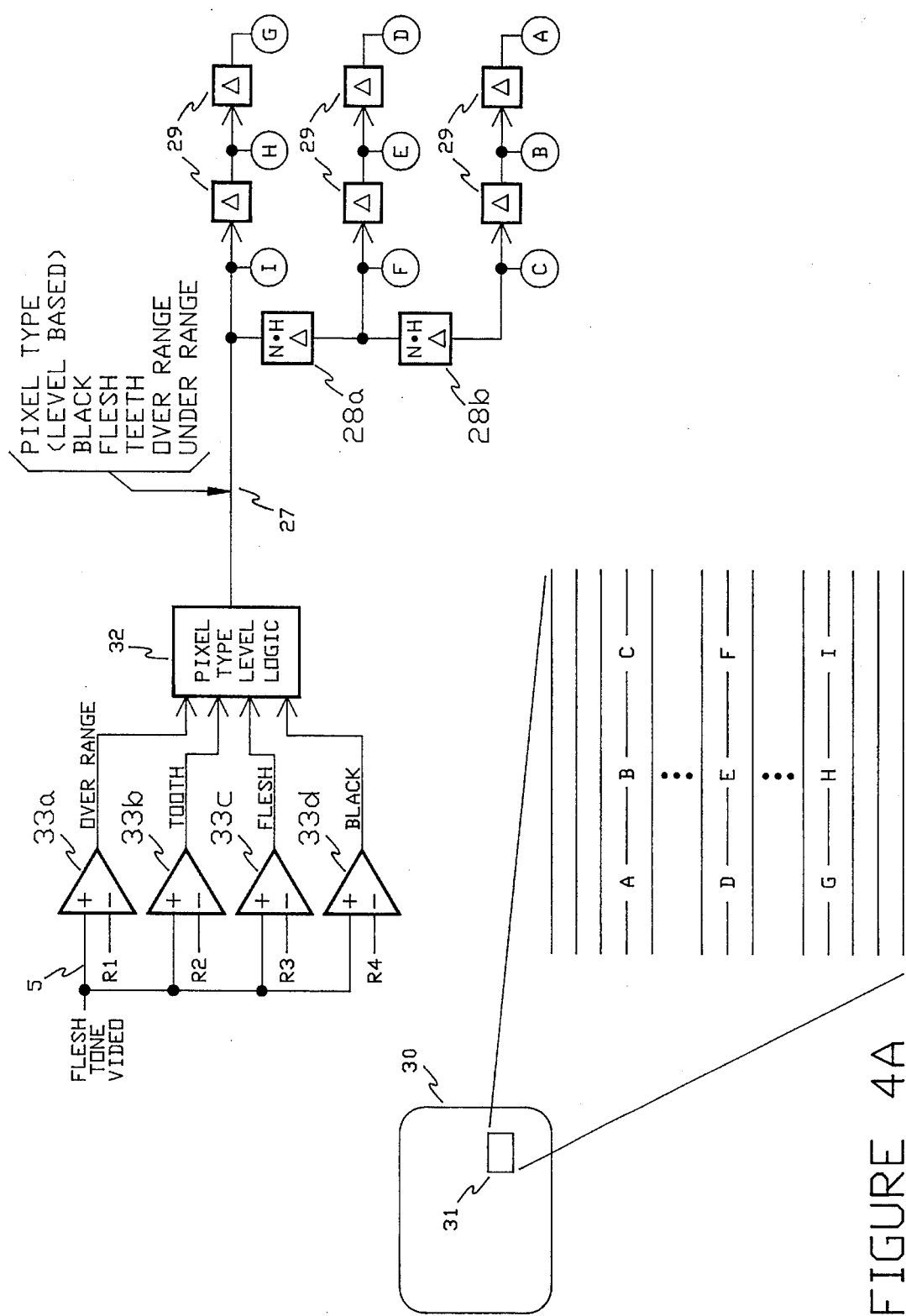
FIG. 4A is a block diagram of the preferred embodiment of the pixel type level and matrix delay portions of the invention.
Figure 4B:
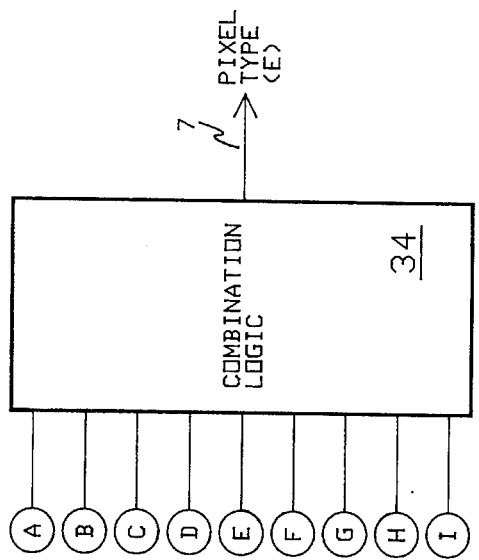
FIG. 4B is a block diagram of the preferred embodiment of the pixel type combination logic portion of the invention.

FIGS. 4A and 4B show details of the pixel type logic circuit 6 of FIG. 1. FIG. 4A shows the input flesh tone video 5 from the flesh tone matrix 4, which flesh tone video is coupled to the input of a plurality of comparators 33a–33d. The comparators compare the level of the video 5 to a plurality of references R1–R4 which have values R1>R2>R3>R4>0. The magnitude of the signal 5 will vary depending on the nature of the image corresponding thereto, for example black will have a level lower than R3 and higher than R4. Similarly, lips and other flesh will have a level greater than R3 but less than R2, teeth will have a level greater than R2 but less than R3. Video levels greater than R1 and less than R4 will correspond to image elements which are from other than faces of interest. While not specifically detected in the present embodiment, the palate and tongue may also be detected by the use of additional comparators 33 to detect subtle shades of flesh coloring.

It will be appreciated that while the detection of various image elements is preferred in the above form, that it is nevertheless possible to utilize other forms of detection, for example by simply demodulating the input video 1 along a nonstandard axis which facilitates the identification of flesh coloring. Such demodulation will eliminate the need for the matrix 4. Further, the detection provided by comparators 33 and 32 may be incorporated within such detection. Alternately, plural detectors may be utilized, each optimized for the particular characteristic or color being detected.

The outputs of the comparators 33 are coupled to a pixel type Level logic 32 which outputs a signal 27 indicating the type of pixel based on the aforementioned level. The signal 27, being an indication of the type of pixel present at 5 may be coupled directly out of 6 as signal 7, however it is preferred that further operations be performed on 27 to ensure a higher degree of accuracy.

This signal 27 is preferred to be coupled to a matrix of delays including 28a and 28b which are multiples N of 1 horizontal line and delays 29 which are less than 1 horizontal line. It is preferred that 28a and 28b be 36 lines and 29 be 64 pixels. It will be understood that while the matrix shown is symmetrical by virtue of the delays 28 being the same and delays 29 being the same. The choice of delay length is the preferred arrangement, and other delay sizes may be utilized for each delay, in a patterned or unpatterned fashion without departing from the spirit and scope of the invention.

The delay matrix composed of delays 28 and 29 provide simultaneous level based pixel type data A–I corresponding to picture elements in a matrix location 31 on the scanned image raster which comprises the image frame 30 as shown in the accompanying insert in FIG. 4A.

The matrix of simultaneous pixel type data signals A–I are coupled to a combination logic circuit 32 shown in FIG. 4B which inspects the data to determine the type of facial elements the sample is taken from. It will be understood that this data is preferred to be derived from the color saturation, hue and brightness of the image as represented by the video signal which carries the image, as previously described. Alternatively, any one of the color saturation, hue and brightness, or combinations of the three may be used. The logic signal 32 inspects all of the signals A–I and provides an output signal 33 corresponding to pixel of location E. The combination logic makes use of several of the mouth parameters described above to ensure that there is a high probability of properly identifying facial characteristics of the pixel corresponding to location E of 31 in FIG. 4A. For example, if the pixel E is from the black hole in the mouth, then it is surrounded by teeth or flesh on the top and bottom, and flesh or black on the left and right. If the pixel E corresponds to the upper teeth, then it will have flesh above it and black below it. If the pixel E corresponds to the lower teeth, then it will have black above it and flesh below it. Similarly the upper lip and lower lip may be distinguished.

The table 33 of FIG. 4B describes the logic operation of 34. Each horizontal row is a possible output 7 and the vertical columns represent the state or values of A–I which are required to provide that output. For example, in the previous situation where pixel E is from the black hole in the mouth, then it must be black as shown by B in the E column, and must be is surrounded by teeth or flesh on the top and bottom, shown as F/T for pixel columns A–C and G–I, and flesh or black on the left and right shown as B/F for pixel columns D and F.

It can be seen that numerous image conditions which would cause an undesired signal at 27 may be filtered out by 32. For example, the black pupils of the eye, which would give a black signal from 32 are unlikely to have flesh or teeth above and below and black or flesh to the right and left, especially since the eyes are usually close to hair and the edge of the face. The false condition arising from black pupils would be eliminated and a false mouth related black output by 34 is prevented. Similarly, the requirement of 34 that black be surrounded by flesh or teeth will eliminate large black portions of the image from providing an unwanted output on 7. The logic expressed in the table 35 is implemented in the combination logic 34 to give a higher probability of properly identifying pixel type than was present on the signal 7.

It will be recognized that the operation of 34 is somewhat dependent upon the image size. For example for large face images the entire area of the matrix of pixels 31 may fall within the mouth. It will be noted that for small face sizes on the image frame that lip sync problems are not very noticeable and thus correction is not as important. If only larger sizes of mouths are to be detected, this may be accommodated by increases in the delay size 28 and 29. It will also be noted that less than the suggested 9 element matrix may be utilized as well, with some reduction in cost and accuracy of the detection and more may be utilized with improved accuracy and cost.

In order to overcome image size relate problems it is desired to increase the number of pixels in the matrix to cover a larger variation of sizes of mouths in the image. Accordingly, it is desirable to utilize many pixels giving rise to increased size of the matrix delay elements 28 and 29 as well to increased size of the combination logic 34. Given this desire to utilize a large number of elements in the matrix it will be seen that alternate methods of determining the location and type of mouth related pixels is also desirable. The circuitry which is preferred for such operations is a high speed microprocessor coupled to the pixel type level logic 32 of FIG. 4A to receive each pixel type and store it in a random access memory. The data stored in the memory may then be operated on by the microprocessor under software or other programming control to inspect each pixel type and its surrounding or neighboring pixel types to determine with a high degree of accuracy the black, flesh and teeth pixels which are associated with the mouth. Furthermore by use of a microprocessor, one of ordinary skill in the art will recognize that the functions of 33 and 32 of FIG. 4A as well as the functions of any or all of the elements of FIG. 1 may also be provided thereby.

Figure 5:
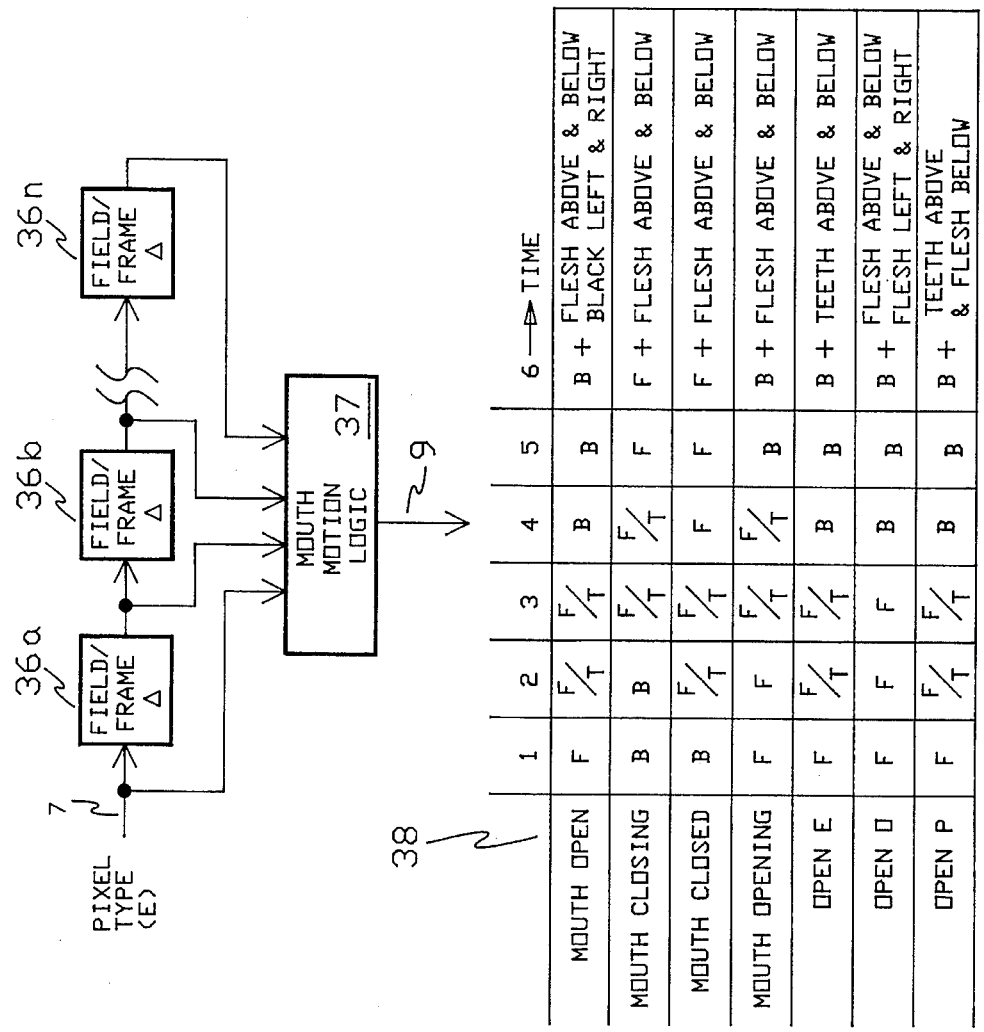
FIG. 5 is a block diagram of the preferred embodiment of the mouth pixel type combination logic portion of the invention.

FIG. 5 shows a block diagram of the mouth motion logic circuit 8 which received the pixel type data 7 and outputs mouth motion data 9. Multiple frames of the pixel data are provided to 37 by the field/frame delays 36a–36n. The choice of delays 36 is the same as for delays 11 of FIG. 1, and it is preferred that they be the same in type and number. The configuration of the circuit for each input to 37 of FIG. 5 is similar to that of elements 28 and 29 of FIG. 4A, thereby providing a matrix of pixel type data for each image frame which is input. Mouth motion logic 37 thus operates with the matrix of pixel type data to provide Mouth motion data 9. In particular, it is desired to provide an output logic code corresponding to one of the events on the left horizontal rows of 38 in response to multiple image frames, corresponding to the time sequence of change of a particular pixel of the image as shown in the columns 1–6, taking into account the nature and time sequence of change of the neighboring pixels as shown in logic table 38.

In particular, sounds of the types O, E and P may be distinguished, both of which are made with the mouth open. The O type sounds are usually made without upper or lower teeth showing and the E type sounds are usually made with both the upper and lower teeth showing and the P type sounds made after the mouth being closed with only the upper teeth showing.

The Mouth motion data 9 is then coupled to the sequence logic 10 where it is used to determine the video mouth sounds 16 as previously described with respect to FIG. 1.

Figure 6:
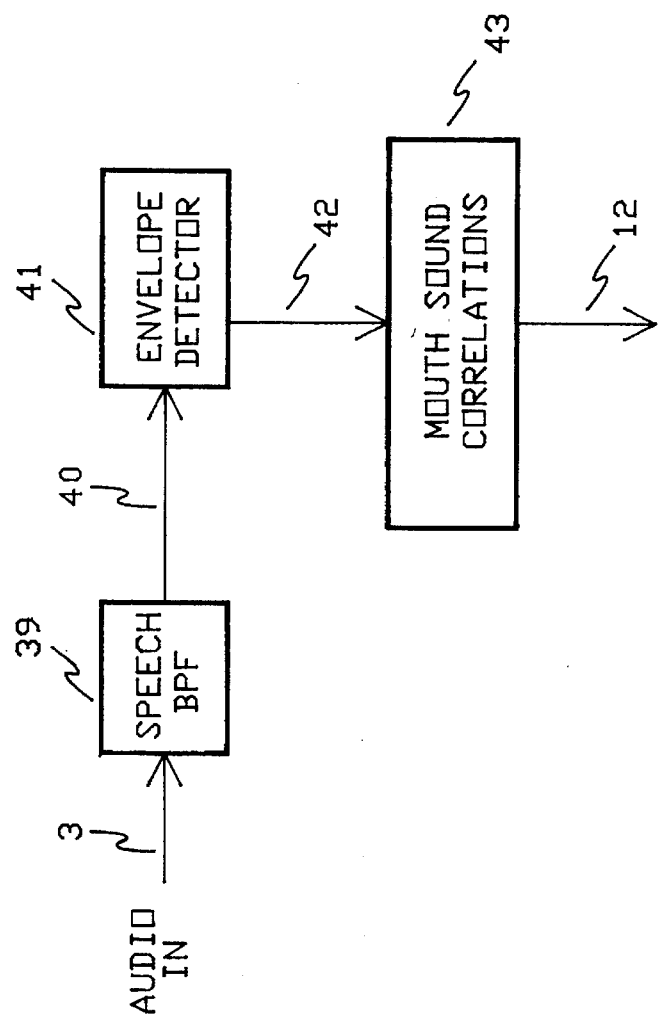
FIG. 6 is a diagram of the sound type circuit 14 of FIG 1.

FIG. 6 shows a diagram of the sound type circuit 14 of FIG. 1. FIG. 6 shows the audio input 3 which is coupled to a speech band pass filter 39 which outputs audio which is band pass filtered to the range of 200 Hz to 3000 Hz. It is preferred that the audio at 3 be in sampled digital form in order that 14 may be implemented with digital circuitry. The band pass filtered audio 40 is coupled to an envelope detector 41 where the envelope is detected and output at 42. The envelope is coupled to a mouth sound correlation circuit 43 where it is compared to known envelopes of mouth sounds. When a match is found, that is when the band passed audio envelope is found to match a particular mouth sound envelope, data representing that mouth sound is output on 12. It is preferred that the data representing mouth sounds on 12 be of the same form as the data representing mouth sounds on 16 of FIG. 1. The matching of the band passed audio envelope 42 to a particular mouth sound envelope may be performed by providing the envelope 42 in digitized form and providing the known envelopes in the same digitized form. When a complete envelope from 42 corresponding to a sound is received by 43, it is then correlated against all of the stored envelopes to find the best match. If the match is above a known threshold level then the data corresponding to that sound is output at 12 as previously described.

Alternate forms of detecting mouth sounds in the audio 3 may be utilized as well. For example the audio may be analyzed by any of the various speech analysis methods which are well known in the art. Such analysis provides the ability to detect various vocal tract parameters such as placement of teeth and lips, which is frequently used in linear predictive methods of speech coding for producing very low data rate digitally coded speech. There are also Fast Fourier Transform (FFT) based speech analysis methods which can be adapted to such use as will be appreciated by one of ordinary skill in the art from the teachings herein.

Figure 7:
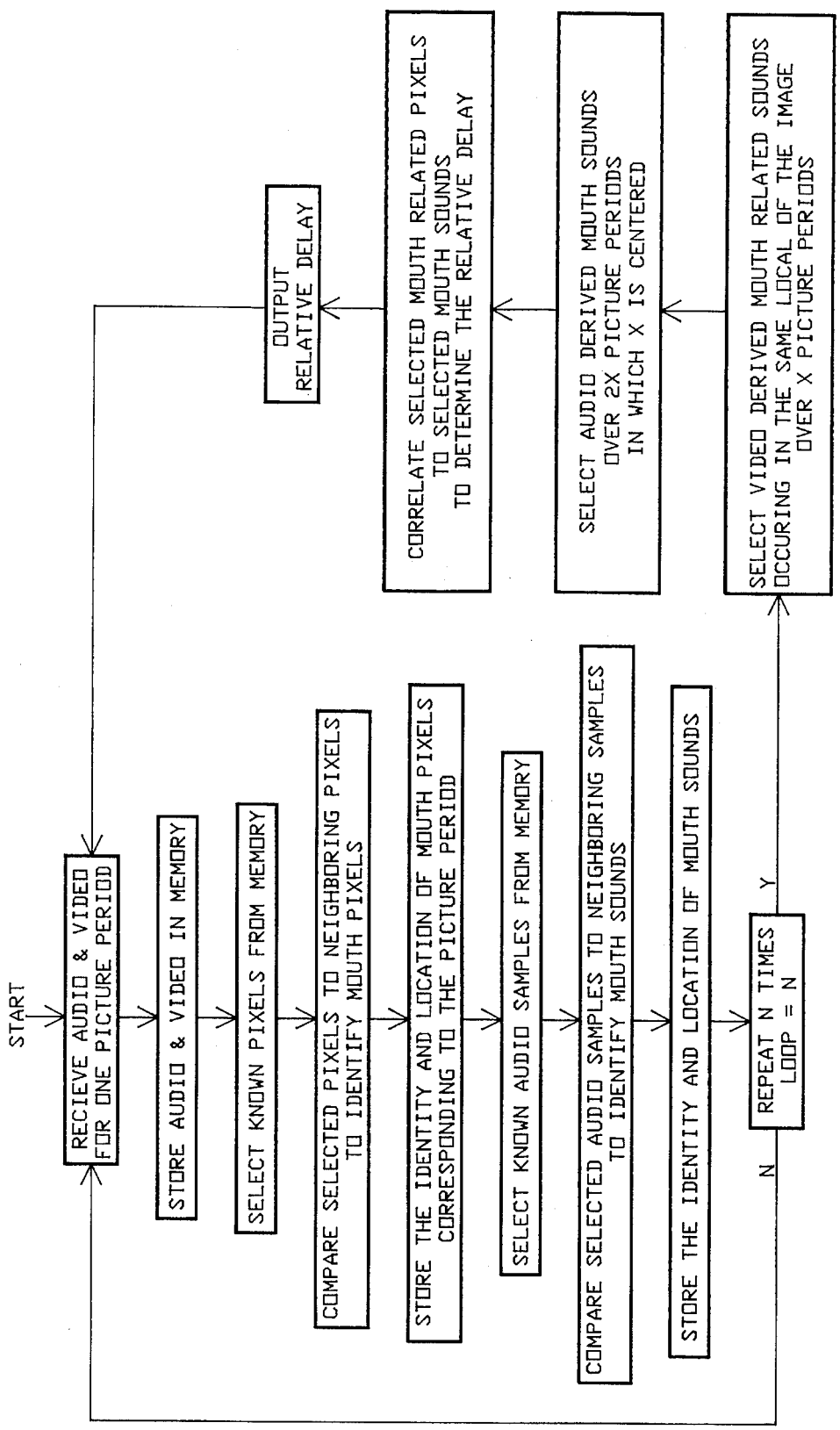
FIG. 7 is a representative flow chart of the steps which a microprocessor needs to perform present invention.

FIG. 7 shows a representative flow chart of the steps which a microprocessor or other computer device may perform to practice the present invention. At the start of the operation, audio and video signals are acquired for one picture period. The acquired signals are stored in a memory. Known pixels from the video memory are selected. The selected pixels are compared to neighboring pixels to identify mouth pixels. The identity and location of the mouth pixels corresponding to the particular picture period are stored. Known audio samples are selected from audio memory. The selected audio samples are compared to neighboring samples to identify mouth sounds. The identity and location of the mouth sounds are stored. The above loop is repeated a number of times N to provide N sets of stored identity and location of the mouth pixels and identity and location of the mouth sounds. Mouth pixels which occur in the same local of the image are selected over a second number of picture periods X. Mouth sounds are selected over 2X picture periods which are centered over X. The selected mouth sounds are compared to the selected mouth pixels to determine the relative delay. The relative delay is output from the operation and the operation is started again.

Although the present invention has been described with a certain degree of particularity with respect to the preferred embodiment thereof, it is understood that the present disclosure of the preferred embodiment form has been made only by way of example and that numerous changes in the details of construction and combination and arrangements of parts and components as well as changes in the performance and operation thereof, as well as combination of functions within or as part of other devices may be resorted to without departing from the equivalence, spirit and the scope of the invention and elements thereof as hereinafter claimed.

What is claimed is:

1. A method of determining the location and movement of the lips of a speaker in a sampled image, which said image may show one or more facial elements of said speaker including upper and lower lips, palate, teeth, tongue, and a dark hole between the lips, said method including the steps of:

a) for each of a plurality of image frames, selecting a first group of samples from a known area of said image, b) inspecting at least one parameter of each of said samples of each said first group with respect to at least a first facial element, to identifying said samples which are taken from said first facial element, if any should exist, c) in response to step b), selecting from said identified samples a second group of samples, if any should exist, representing at least samples taken from said lips and said dark hole between the lips, d) determining the motion of said lips by inspecting said second group of samples corresponding to each said plurality of image frames to determine a sequence of change in at least said dark hole between the lips, e) determining said location and movement of the lips by comparing said sequence of change to known sequence patterns.

2. A method as claimed in claim 1 wherein in said step c) samples representing at least one of the palate, teeth and tongue are included in said second group.

3. A method as claimed in claim 1 wherein said at least one parameter in step b) includes at least color saturation or hue.

4. A method as claimed in claim 1 wherein said inspecting at least one parameter in step b) includes inspecting in response to the color saturation, hue and brightness.

5. A method for measuring the relative timing of an audio and a visual portion of a program including the steps of:

a) identifying in said visual portion the presence and occurrence in time of known mouth sounds created by visual patterns of mouth movements, b) identifying in said audio portion the presence and occurrence in time of known mouth sounds created by audible patterns of mouth movements, c) storing first data representative of a sequence of said known mouth sounds of step a), d) storing second data representative of a sequence of said known mouth sounds of step b), e) comparing said first data of step c) with said second data of step d) to determine a relative position of a best match thereof, and measuring said relative timing in response to the relative position of the best match.

6. A method as claimed in claim 5 wherein said mouth sounds in step a) are determined by the presence of movements and nonmovements of the lips of a speaker portrayed by said visual portion.

7. A method as claimed in claim 5 wherein said mouth sounds in step a) are determined by parameters of the direction of movement of the lips of a speaker portrayed by said visual portion.

8. A method as claimed in claim 5 wherein said mouth sounds in step a) are determined by parameters of the lips getting closer or further apart of a speaker portrayed by said visual portion.

9. A method as claimed in claim 5 wherein said mouth sounds in step a) are determined by the mouth being open following the mouth opening and the mouth being closed following the mouth closing of a speaker portrayed by said visual portion.

10. A method as claimed in claim 5 wherein said mouth sounds in step a) are determined by analyzing said visual patterns of mouth movement to determine possible types of said mouth sounds being uttered by a speaker portrayed by said visual portion.

11. A method as claimed in claim 5 wherein said mouth sounds in step a) are determined by analyzing said visual patterns of mouth movement taken in conjunction with patterns of exposure of teeth and the dark hole formed by the open mouth to determine possible types of said mouth sounds being uttered by a speaker portrayed by said visual portion.

12. A method as claimed in claim 5 wherein said mouth sounds in step b) are determined by analyzing an amplitude related envelope of a band pass limited version of said audio portion.

13. A method as claimed in claim 5 wherein said mouth sounds in step b) are determined by comparing an amplitude related envelope of a band pass limited version of said audio portion to known envelopes of known mouth sounds.

14. A method as claimed in claim 5, 6, 7, 8, 9, 10, 11, 12 or 13 wherein said step for measuring is performed in response to uncorrected said audio portion and said video portion with an earlier arriving one thereof being delayed in response to said measuring.

15. A method as claimed in claim 5, 6, 7, 8, 9, 10, 11, 12 or 13 wherein an earlier arriving one of said audio portion and said video portion is delayed by said step for measuring which being performed in response the delayed one and a later arriving one of said audio portion and said video portion.

16. An apparatus for determining the location and movement of the lips of a speaker in a sampled image, which said image may include facial elements the types of which may include ones of upper and lower lips, palate, teeth, tongue, and a dark hole between lips, said apparatus including:

a) a selecting circuit to select a first group of samples from a known area of said image over a plurality of image frames, b) a first inspection circuit for inspecting at least one parameter of each of said samples of said first group to determine a type of facial element, if any, the samples are taken from, c) a storing circuit for storing a second group of samples representing at least samples taken from the lips and the dark hole between the lips in response to said first inspection circuit, d) a second inspection circuit for inspecting known ones of said second group of samples over a sequence of said image frames to determine a sequence of change in the type of facial element said known ones thereof are taken from, e) a comparison circuit for determining said location and movement of the lips by comparing said sequence of change to known sequence patterns.

17. An apparatus as claimed in claim 16 wherein in said storing circuit, samples representing at least one of the palate, teeth and tongue are included in said second group of samples.

18. An apparatus as claimed in claim 16 wherein said at least one parameter in said first inspection circuit includes at least one of color saturation or hue.

19. An apparatus as claimed in claim 16 wherein said inspecting at least one parameter in said first inspection circuit includes inspecting in response to the color saturation, hue and brightness.

20. An apparatus for measuring the relative timing of an audio and a visual portion of a program said apparatus including:

a) a video identifying circuit responsive to said visual portion to identify the presence and occurrence in time of known mouth sounds, b) an audio identifying circuit responsive to said audio portion to identify the presence and occurrence in time of known mouth sounds, c) a first storing circuit for storing first information responsive to a sequence of said known mouth sounds of said video identifying circuit, d) a second storing circuit for storing second information responsive to a sequence of said known mouth sounds of said audio identifying circuit, e) a comparing circuit for comparing said first information of said first storing circuit with said second information of said second storing circuit to determine a relative position of a best match thereof, with the relative position of said best match being a measuring of said relative timing.

21. An apparatus as claimed in claim 20 wherein said mouth sounds in said video identifying circuit are determined by the presence of movements and nonmovements of the lips of a speaker portrayed by said visual portion.

22. An apparatus as claimed in claim 20 wherein said mouth sounds in said video identifying circuit are determined by parameters of the direction of movement of the lips of a speaker portrayed by said visual portion.

23. An apparatus as claimed in claim 20 wherein said mouth sounds in said video identifying circuit are determined by parameters of the lips of a speaker portrayed by said visual portion getting closer or further apart.

24. An apparatus as claimed in claim 20 wherein said mouth sounds in said video identifying circuit are determined by the mouth being open following the mouth opening and the mouth being closed following the mouth closing of a speaker portrayed by said visual portion.

25. An apparatus as claimed in claim 20 wherein said mouth sounds in said video identifying circuit are determined by analyzing patterns of mouth movement to determine possible types of sounds being uttered by a speaker portrayed by said visual portion.

26. An apparatus as claimed in claim 20 wherein said mouth sounds in said video identifying circuit are determined by analyzing patterns of mouth movement taken in conjunction with patterns of exposure of teeth and black hole formed by an open mouth to determine possible types of sounds being uttered by a speaker portrayed by said visual portion.

27. An apparatus as claimed in claim 20 wherein said mouth sounds in said audio identifying circuit are determined by analyzing an energy envelope of a band pass limited version of said audio portion.

28. An apparatus as claimed in claim 20 wherein said mouth sounds in said audio identifying circuit are determined by comparing an energy envelope of a band pass limited version of said audio portion to known envelopes of known mouth sounds.

29. An apparatus as claimed in claim 20, 21, 22, 23, 24, 25, 26, 27 or 28 further comprising a delay means, said delay means operates in response to uncorrected said audio portion and said video portion with an earlier arriving one thereof being delayed in response to said measuring.

30. An apparatus as claimed in claim 20, 21, 22, 23, 24, 25, 26, 27 or 28 further comprising a delay means, wherein an earlier arriving one of said audio portion and said video portion is delayed by said delay means operating in response the delayed one and a later arriving one of said audio portion and said video portion.

\* \* \* \* \*